(12) United States Patent
Lelievre et al.

(10) Patent No.: US 7,152,717 B2
(45) Date of Patent: Dec. 26, 2006

(54) SYSTEM FOR FITTING DISK BRAKE PADS AND DISK BRAKE COMPRISING SUCH A SYSTEM

(75) Inventors: Bruno Lelievre, Chatillon (FR); Nicolas Oudin, Noisiel (FR); Jean-Pierre Boisseau, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 11/096,624

(22) Filed: Apr. 1, 2005

(65) Prior Publication Data

US 2005/0241897 A1 Nov. 3, 2005

(30) Foreign Application Priority Data

Apr. 29, 2004 (FR) .................................. 04 04614

(51) Int. Cl.
*F16D 65/40* (2006.01)
(52) U.S. Cl. .............................. 188/73.38; 188/250 E; 188/250 G; 188/250 F
(58) Field of Classification Search ............ 188/73.31, 188/73.35, 73.36, 73.37, 73.38, 250 D, 250 E, 188/250 G, 250 P
See application file for complete search history.

(56) References Cited

U.S. PATENT DOCUMENTS

| 3,638,765 | A | * | 2/1972 | Flaherty et al. | .......... 188/73.38 |
| 4,371,060 | A | * | 2/1983 | Iwata | .......... 188/73.38 |
| 4,498,559 | A | * | 2/1985 | Katagiri et al. | ........ 188/1.11 W |
| 5,033,590 | A | * | 7/1991 | Kobayashi et al. | .... 188/1.11 W |

* cited by examiner

*Primary Examiner*—Devon Kramer
(74) *Attorney, Agent, or Firm*—Leo H. McCormick, Jr.; Sarah Taylor

(57) ABSTRACT

A disk brake having a support (2) for a pad (3) having a first lug (21) located in a first cavity (41.2) of a holder (41) and a second lug (22) located in a second cavity (42.2) of a holder (42) to guide the support (2) in a direction perpendicular to a plane of a rotor on movement of the brake pad (3) toward the rotor to effect a brake application. The improvement comprising a plate (10) attached to the support (2) by branches (11.1,11.2,11.3) of a first spring (11) that extends from a first end (10.1) and by branches (12.1,11.2, 12.3) of a second spring (12) having hat extend from a second end 10.2 to respectively resiliently retain lug (21) in cavity (41.2) and lug (22) in cavity (42.2) while moving with the support (2) during a brake application.

8 Claims, 6 Drawing Sheets

SYSTEM FOR FITTING DISK BRAKE PADS AND DISK BRAKE COMPRISING SUCH A SYSTEM

BACKGROUND OF THE INVENTION

The invention relates to a system for fitting disk brake pads and a disk brake comprising such a system.

As is known in the prior art, a disk brake comprises a disk associated with each axle of a vehicle and fixed to this axle with respect to rotation. Brake pads which are virtually fixed with respect to rotation grip the disk, when a braking command is given, to brake or immobilize it. In this operation, the brake pads move in a direction perpendicular to the plane of the disk. For this purpose, each brake pad support has lateral ends such as "lugs" which serve to guide the brake pad in a holder in a direction perpendicular to the plane of the disk.

In a known method, as described for example in French patent application FR9914024, the ends of each brake pad support are placed in guide springs which are fitted in the grooves of the holder. These springs retain the pad radially and tangentially in a damped way because of the elasticity of the springs which enables vibrations to be damped. However, the assembly must leave the brake pad free to move in the direction perpendicular to the plane of the disk, to enable it to come into contact with the disk in response to the braking command or to enable it to move away from the disk when the braking command is terminated.

This system requires two guide spring systems at the ends of the brake pad support, in addition to a vibration damping plate.

SUMMARY OF THE INVENTION

The object of the invention is to reduce the number of parts for fitting disk brake pads and to reduce the time taken to fit these pads.

The invention therefore relates to a system for fitting disk brake pads for pad supports having guide ends on two lateral ends. This system comprises a plate in which one dimension between two ends located along one direction is substantially equivalent to the distance separating the two lateral ends of a pad support. Said plate is provided at each of its ends with at least a first spring, these springs being provided to grip the guide ends of a pad support and also to be gripped in a retaining housing of a brake system.

Said first spring comprises at least one strip curved in a U-shape, a first branch of which is shorter than the second branch. One end of the first branch of the U-shape is connected to one end of the plate. An inner face of the second branch of the U-shape is turned toward the plate and the end of this inner face is intended to be in contact with a side of a guide end of a pad support. An outer face of the second branch of the U-shape is turned in the direction away from the plate and is intended to be in contact with a support part.

The second branch of the U-shape is advantageously curved inward, the convex face being the inner face of this second branch of the U-shape.

It is also possible to provide the end of the second branch with a tab turned toward the plate.

In a case in which the invention is intended for application to a brake pad support whose guide ends have three sides each, it is possible to provide each end of the plate with a second and a third spring, which are similar to the first spring and in which each of the ends of the inner faces of the second branches of the U-shapes is intended to be in contact with one side of a guide end.

Advantageously, the plate comprises a hole for fixing the plate to the brake pad support.

Advantageously, the face opposite the face intended to be in contact with the brake pad support is covered with a layer of a damping material. A layer of grease can also be provided between said plate and the brake pad support.

The invention is also applicable to a brake pad support fitting assembly using the preceding assembly system. The brake pad support has two guide ends located at two of these opposing lateral ends, and its guide ends are gripped by said springs.

The invention is also applicable to a disk brake in which a support part has two openings with a distance between them substantially equal to the dimension of the plate measured between its two ends. The two ends of the plate are placed in these openings with the outer face of the second branch of each U-shaped strip in contact with the sides of one of the housings.

Advantageously, the surfaces of each pad support in contact with a U-shaped strip are covered with a layer of a material having a low coefficient of friction.

According to one variant of the invention, one of the spring strips has a more elongated U-shape than the other spring strips and said tab has a height h with respect to the brake pad support which is such that it is intended to come into contact with the brake disk when the degree of wear of the brake pad reaches a specified level.

The various aspects and characteristics of the invention will be made clearer by the following description and the attached figures.

DETAILED DESCRIPTION OF THE INVENTION

Figure 1:
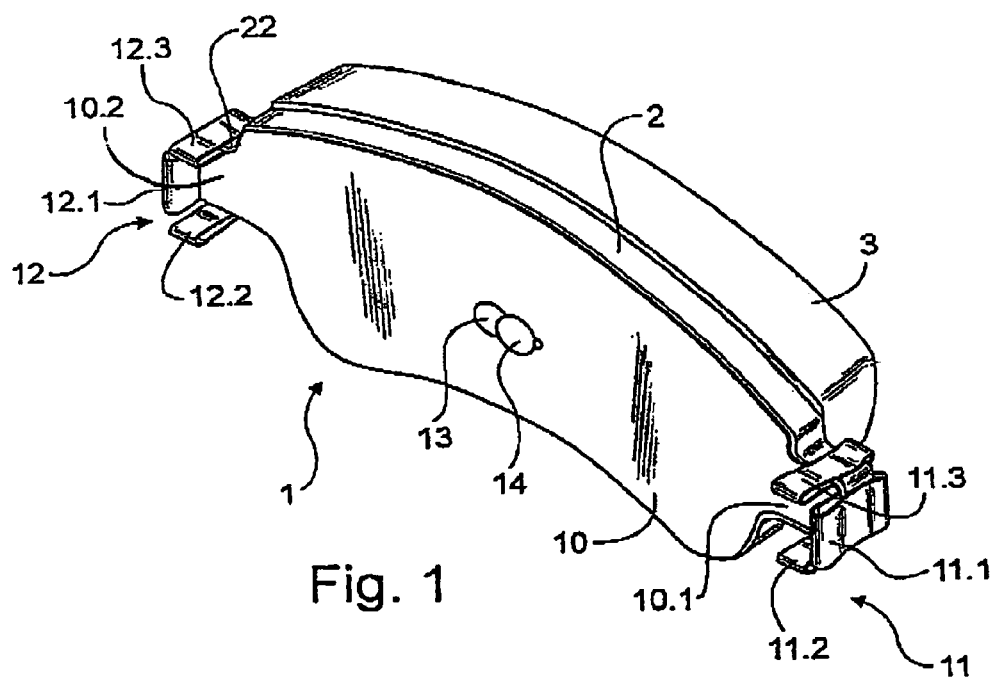
FIG. 1 shows an example of embodiment of the system according to the invention.

With reference to FIG. 1, an example of an embodiment of the system according to the invention will first be described.

A fitting device 1 having a shape substantially equivalent to that of a brake pad support terminates in spring systems 11 and 12 at its two ends. In the central part, a plate 10 forms the flat part of the fitting device. This plate is fitted to the brake pad support and acts as a sound absorber between the brake pad support and a member transmitting the braking forces, for example the brake piston (not shown).

The brake pad support 2 has guide ends 21 and 22, for example in the form of lugs, each having outer sides in a way which is known in the prior art. The spring systems 11 and 12 substantially mate with the shapes of the profiles of these lugs. Thus, according to the example of embodiment in FIG. 1, one lug has three sides, and for each side the end spring system has a spring strip in contact with this side. Each lug is therefore housed in a system of three spring strips. Each outer side of the lugs 21 and 22 is in contact with an end spring strip 11.1 and 12.1. The lateral sides of the lugs are in contact with the lateral spring strips 11.2 and 11.3 in the case of the lug 21, and 12.2 and 12.3 in the case of the lug 22. The different spring strips essentially have the same shape. As shown schematically in FIGS. 6a and 6b, each assembly of lug and spring strips is intended to be fitted in a housing 41.2, 41.3 of a holder 41 of the brake system so as to be movable in a direction perpendicular to the plane of the disk as described above.

Figures 2A, 2B:
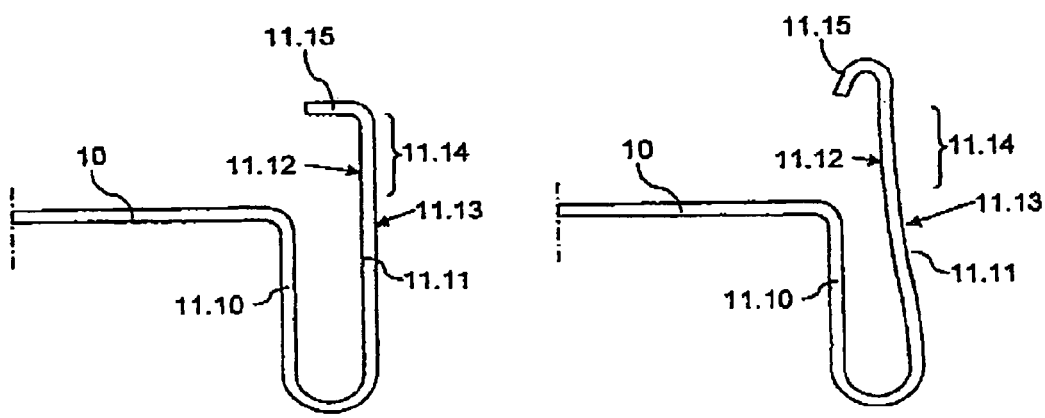
FIGS. 2a and 2b show detailed profile views of a U-shaped spring strip.

FIG. 2b shows the general shape of a spring strip. The spring strip 11.1, for example, has the general shape of a U whose first branch 11.10 is connected to the edge of the plate 10. This first branch of the U-shape of the spring strip is substantially perpendicular to the plane of the plate 10. The second branch 11.11 of the U-shape is longer than the first branch, so that it has an area 11.14 which extends above the surface of the plate 10. The branch 11.11 has a surface 11.12 which is oriented toward the plate 10 and which is intended to be in contact with a support lug of the brake pad. The branch 11.11 also has an outer surface which is intended to be placed in a retaining housing of the brake system holder.

The end of the spring strip terminates in a tab 11.15 which is directed toward the plate 10 so as to hold the brake pad support in place, as described below.

FIG. 2b shows another shape of a spring strip which enables the spring strips to grip the sides of the brake pad support lugs. The tab 11.15 also has a shape which is curved down toward the plane of the plate 10, enabling the brake pad support to be retained elastically while reducing the friction between this tab and the brake pad support.

Figure 3A:
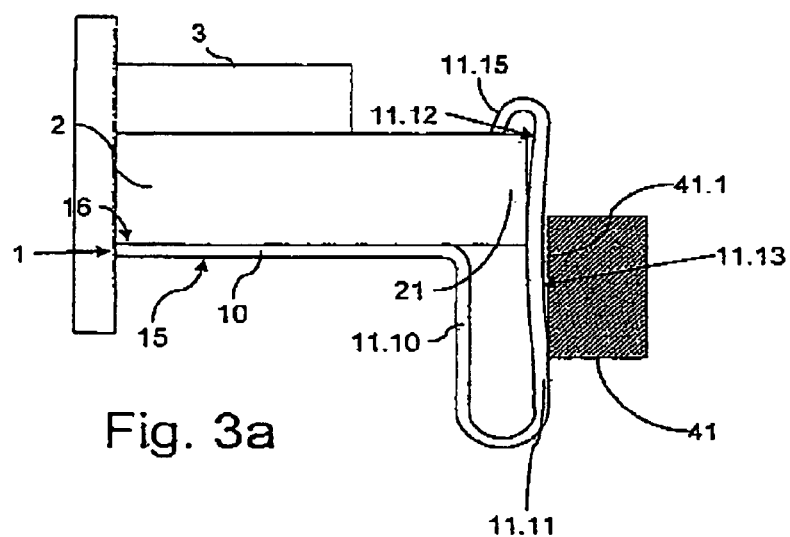
FIGS. 3a and 3b show a detailed sectional view of a plate according to the invention with the brake pad support fitted on this plate.

FIG. 3a shows the fitting of a brake pad support 2 onto a strip 1 and the fitting of this strip against a wall 41.1 of a housing of the brake system holder 41.

The principal face of the brake pad support 2 opposite that which carries the brake pad is applied to the face 16 of the plate 10. The end side of the lug 21 of the brake pad support is engaged under the end of the tab 11.15, and bears against the inner face 11.12 of the spring strip 11.11. The assembly consisting of the support plate, spring strips and brake pad support is applied against a wall 41.1 of the holder 41 of the brake system.

As shown in FIG. 3a, when this fitting is carried out, the branch 11.11 has a concave outer surface 11.13. The brake pad support bears on a surface 11.12 which is convex, thus providing an elastic fitting of the brake pad support.

Additionally, as shown in FIG. 3a, part of the outer surface 11.13 can be in contact with the wall 41.1 of the holder 41.

FIG. 3a shows the position of the brake pad support when the wear on the brake lining is maximal. In this position, the contact surface between the surface 11.13 and the wall 41.1 of the holder does not face the brake pad support.

Figure 3B:
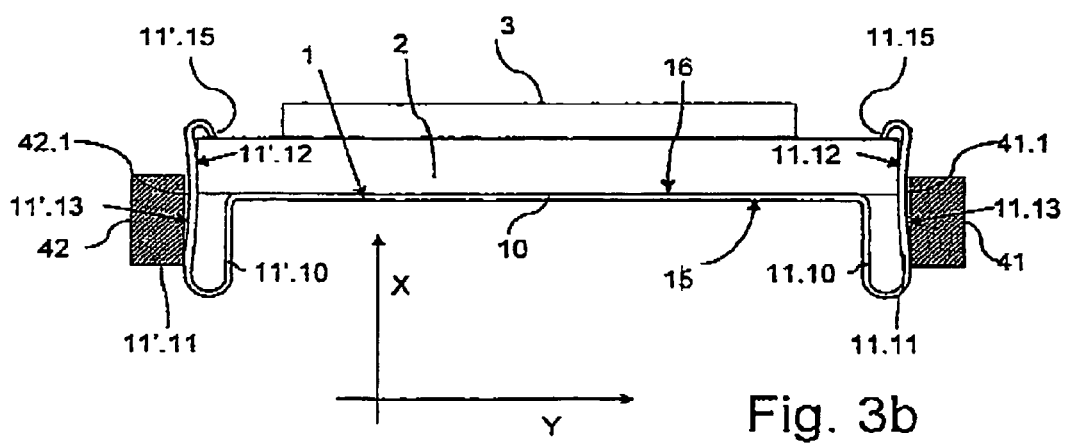

Accordingly, the general view of FIG. 3b shows the fitting of a brake pad support and the plate 10 between two walls 41.1 and 42.1 of housings 41 and 42 of the holder. This figure shows how the assembly consisting of the plate 10 and the brake pad support 2 can move in the direction X. This movement is caused, for example, by the piston of a brake wheel cylinder (not shown in the figure) which imparts braking forces to the face 15 of the plate 10. Conversely, movements in the direction Y, although not completely prevented, are limited and damped by the elasticity of the branches 11.11 and 11'.11 of the end spring strips.

The two ends of the plate 10 have three springs each. A brake pad support lug is therefore placed between three springs with each of its three sides in contact with one spring strip.

Figure 4A:
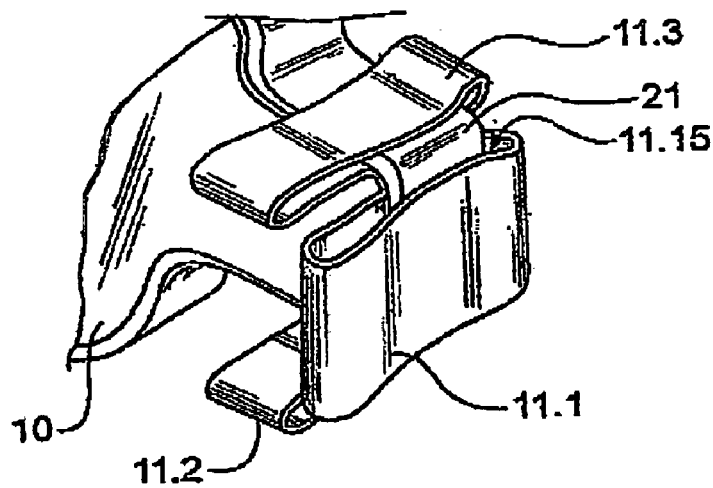
FIGS. 4a to 4c show detailed perspective views of one end of a support plate according to the invention.
Figure 4B:
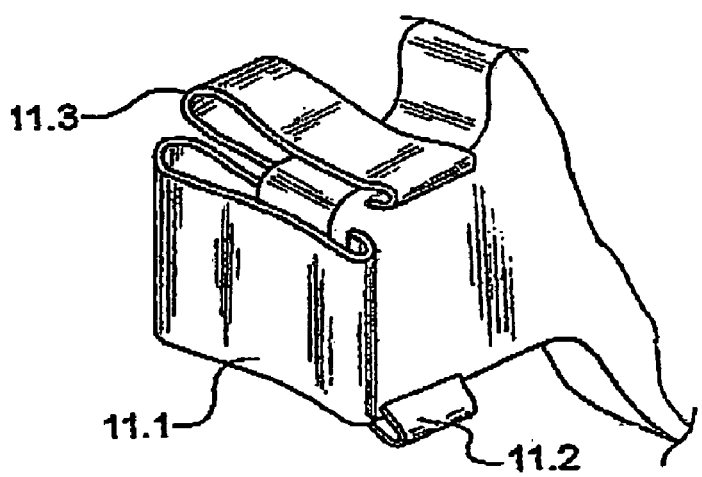
Figure 4C:
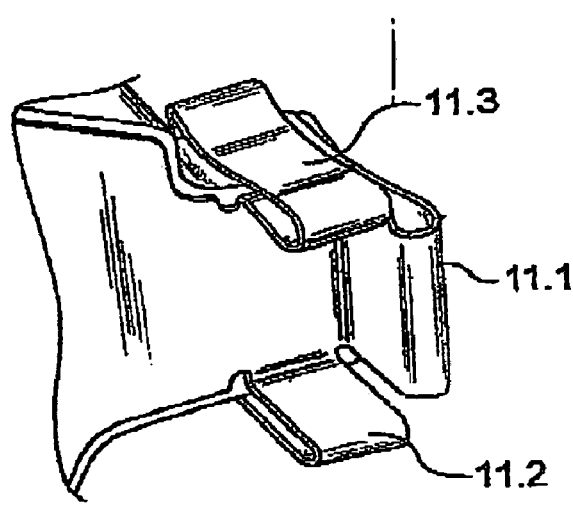

FIGS. 4a to 4c show different perspective views of an assembly consisting of a spring and a brake pad support fitted in this spring assembly.

As shown in FIG. 1, it is possible to provide a hole 13 in the plate 10 for the passage of an element 14 for fixing the brake pad support to the plate 10. This hole can have an elongated shape to permit the passage of the head of the fixing element 14. The fixing element connects the plate 10 to the brake pad support while still allowing the plate 10 to move in the direction Y (FIG. 3b) with respect to the brake pad support.

Additionally, the face 15 of the plate 10 opposite the face carrying the brake pad support can advantageously be covered with a layer of deformable material such as rubber. The face 15 is intended to receive the forces of the brake wheel cylinder piston; the layer of deformable material thus enables the retransmission of any vibrations of the brake pads to be damped.

It is also possible to provide a layer of a lubricant such as grease between the face 16 of the plate 10 and the brake pad support.

Additionally, the sides of the lugs of the brake pad supports can advantageously be covered with a layer of a material, such as paint, having a low coefficient of friction.

In a variant embodiment of the invention, one of the spring strips 11.1 to 11.3 or 12.1 to 12.3 is made to have a more elongated U-shape than the other spring strips. For example, in FIGS. 5a and 5b, the spring strip 11.1 is longer than the others. This structure enables the system to operate as an audible wear indicator. This is because, when the brake lining 3 reaches an advanced state of wear, the plane of the brake pad in contact with the brake disk reaches the level of the outer part 11.17 of the tab 11.15. The outer part 11.17 then rubs against the disk. This friction generates vibrations which are converted to sound waves by the spring strip. The elongated part 11.16 of the U-shape operates as a tuning fork to amplify the sound waves.

In this variant, the outer part 11.17 of the tab 11.15 may be made longer than the tabs of the other spring strips, so that it is the tab 11.15 which is the first part to come into contact with the brake disk. Clearly, the height h of the tab 11.15 is calibrated so that it comes into contact with the brake disk when the degree of wear of the brake pad has reached a specified level.

Figure 5A:
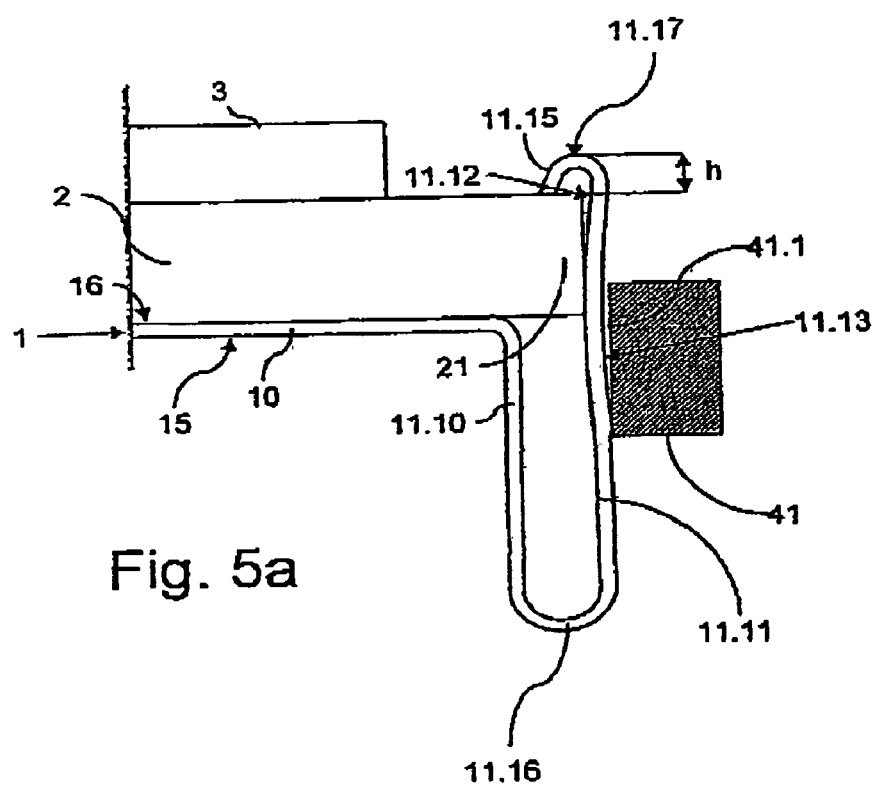
FIGS. 5a and 5b show a variant embodiment of the device according to the invention, in which at least one spring has a more elongated spring branch to act as a sound amplifier and serve as a brake pad wear indicator device.
Figure 5B:
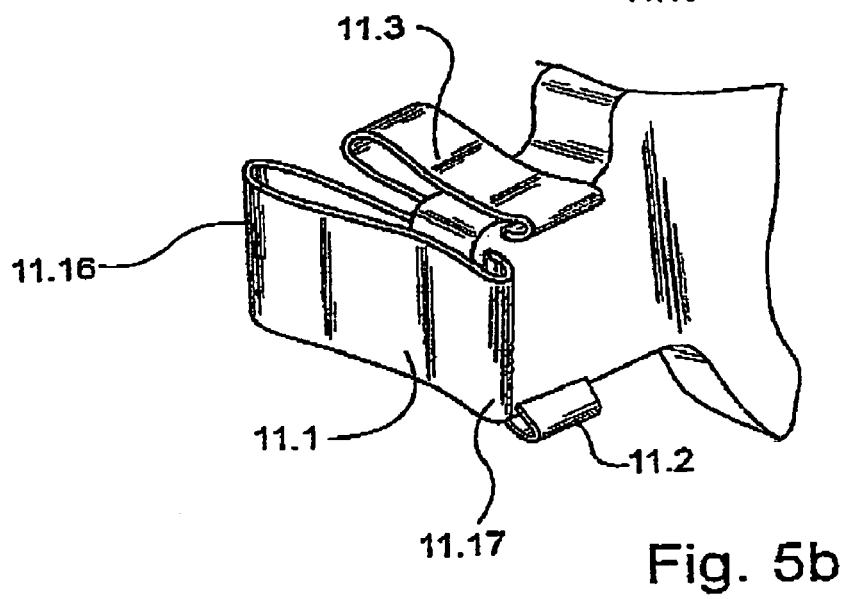

The system of FIGS. 5a and 5b can thus act as a brake pad wear indicator.

The system obtained in this way has fewer parts than known systems, is faster to fit and is therefore more economical.

Figure 6A:
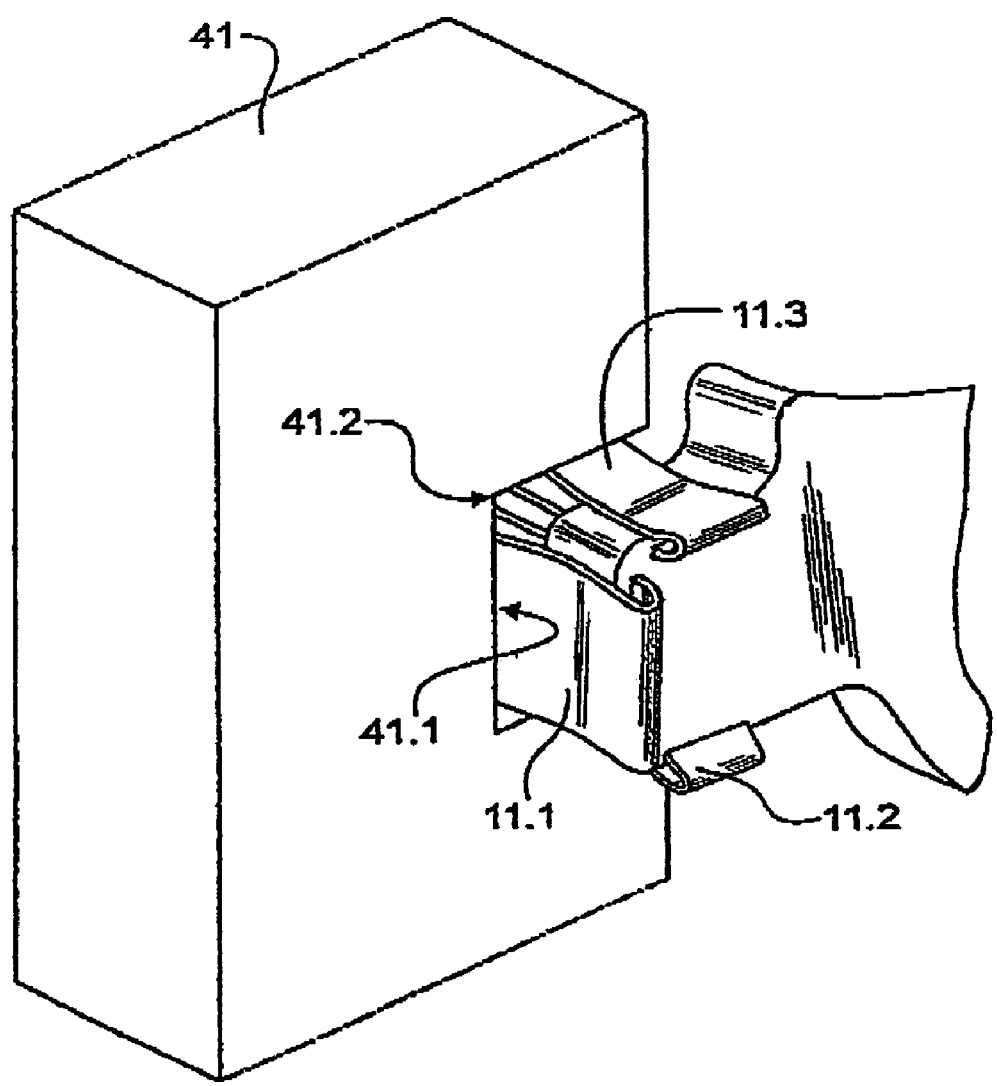
FIGS. 6a and 6b show an example of brake pad fitting according to the invention.
Figure 6B:
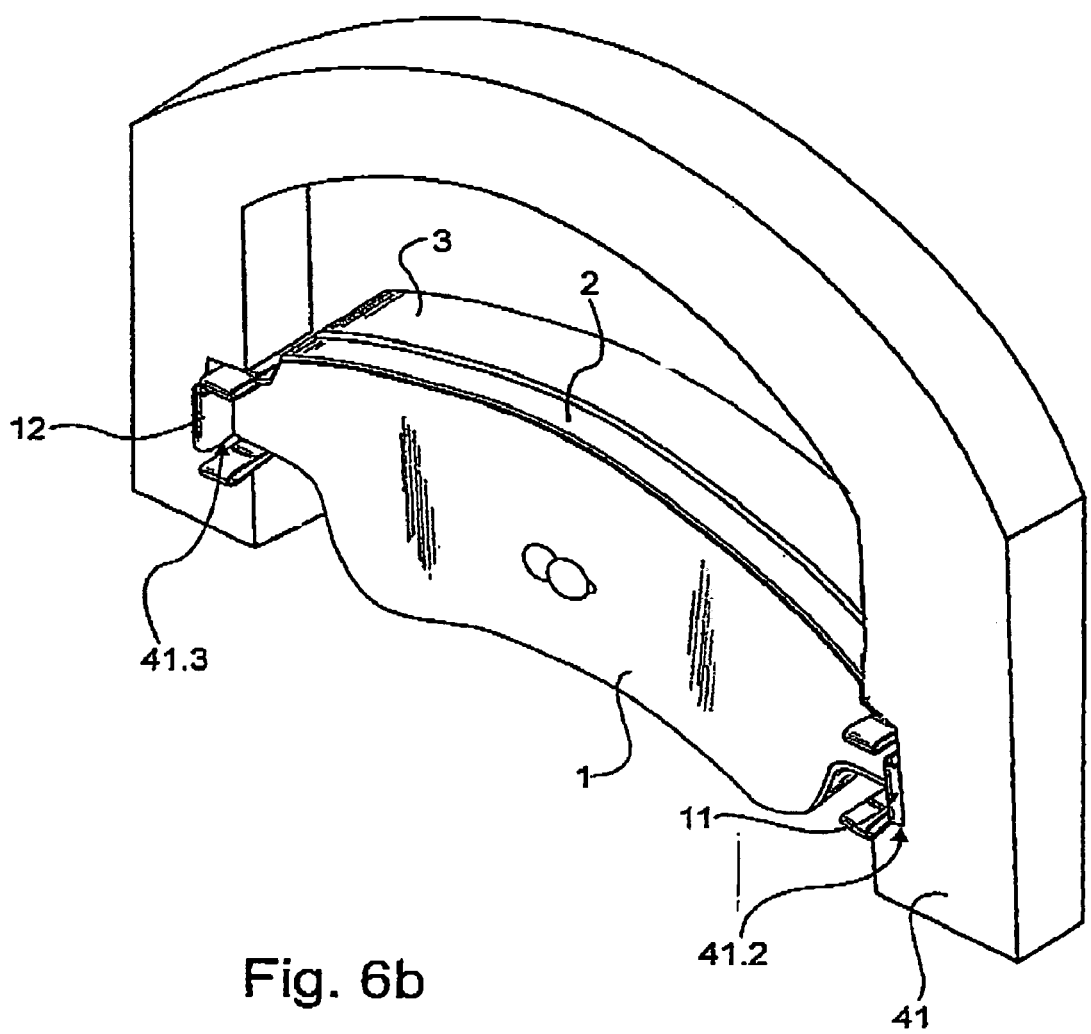

FIGS. 6a and 6b show an example of the fitting of the plate 1 provided with a brake pad support in a support part (or holder) 41. As shown in particular in FIG. 6a, the springs 11.1 to 11.3 of one end of the plate 1 grip one end of the brake pad support and are placed in a cavity 41.2 of a support part 41.

FIG. 6b shows the whole system fitted in the support part (holder) 41 with the brake pad support 2 gripped between the springs of the plate 1 in the cavities 41.2 and 41.3 of the part 41.

The invention claimed is:

1. In a disk brake having a first holder (41) with a first cavity (41.2) therein and a second holder (42) with a second cavity (42.2) therein for respectively receiving lugs (21, 22) that extend from a support (2) for a brake pad (3) to guide the support (2) in a direction perpendicular to a plane of a rotor on movement of the brake pad (3) toward the rotor to effect a brake application, the improvement comprising a plate (10) that is secured to a first side (16) of said support (2) and has a first spring (11) that extends from a first end (10.1) and a second spring (12) that extends from a second end (10.2), said first spring (11) and said second spring (12) each being defined by a U-shape with a first branch (11.10) that is shorter than a second branch (11.11) with an end (11.15) of the second branch (11.11) being turned toward the plate (10), said end (11.15) of said first spring (11) engaging said first lug (21) and said end (11.15) of said second spring (12) engaging said second lug (22) such that the plate (10) is attached to and moves with the plate (2) during a brake application, said second branch (11.11) of said first spring (11) having a first inner face (11.12) that contacts said first lug (21) and an outer face (11.13) that contacts an end wall (41.1) of said first cavity (41.2) and said second spring (12) having an inner face (11.12) that contact said second (lug (22) and an outer face (11.13) that contacts an end wall (41.2) of said second cavity (42.2) such that said plate (10) is resiliently positioned between said first (41.2) and said second (42.2) cavities.

2. The disk brake as recited in claim 1 characterized in that the second branch (11.11) of each of said first (11) and second (12) springs is curved inward to defines a inner convex face (11.12) of said second branch that engages the lug while an outer face (11.13) of the second branch is turned in the direction away from the plate (10) and contacts the end well (41.1; 41.2) of a corresponding support (41.2, 42.2).

3. The disk brake as recited in claims 1 characterized in that said end (11.15) of each of said first (11) and second (12) springs is a tab That is turned toward the plate (10) to resiliently engage the plate (10) and hold the plate (10) on the support (2).

4. The disk brake as recited in claim 1 characterized in the first cavity (41.2) and the second cavity (42.2) each have three sides (21.1, 21.2. 21.3) and in that the first end (10.1) and the second end (10.2) of the plate (10) each have a plurality of springs, each of which engage a corresponding side of said three sides (21.1, 21.2. 21.3) to resiliently position said plate (10) within a cavity.

5. The disk brake as recited in claim 1 wherein said plate (10) is characterized by a hole (13) that allows a fixing element (14) to pass and be connected to said support (2) while allowing said plate (10) to move with respect to said first (41) and second (42) holders.

6. The disk brake as recited in claim 5 characterized in that a face (15) of said plate (10) opposite the first side (16) of the support (2) is covered with a layer of a damping material.

7. The disk brake as recited in claim 1 characterized in that the first cavity (41.2) in the first holder (41.2) and the second cavity (42.2) in the second holder (42) are covered with a layer of a material having a low coefficient of friction to allow said outer face (11.13) of said first spring (11) and said outer face (11.13) of said second spring (12) to freely move with said support (2) during a brake application.

8. The disk brake as recited in claim 1 wherein said characterized in that said end (11.15) of each of said first (11) and second (12) springs have a height h that extends above said support (2) the comes into contact with a brake disk with a degree of wear of the pad (3) reaches a specified level.

* * * * *